Oct. 19, 1954
J. L. OUWELTJES
2,692,349
LOW-PRESSURE MERCURY VAPOR DISCHARGE LAMP
Filed Sept. 2, 1953
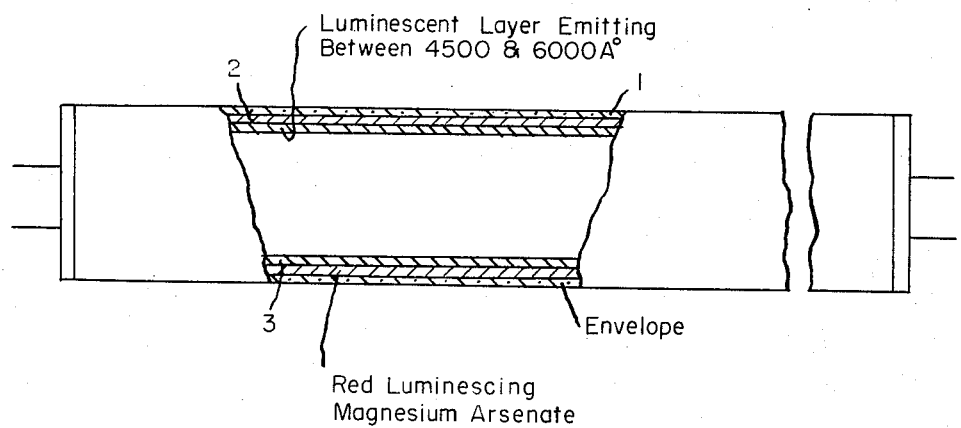
Inventor
JAN LOURENS OUWELTJES
By Fred M Vogel
Agent Patented Oct. 19, 1954

2,692,349

UNITED STATES PATENT OFFICE 2,692,349

LOW-PRESSURE MERCURY VAPOR DISCHARGE LAMP

Jan Lourens Ouweltjes, Eindhoven, Netherlands, assignor to Hartford National Bank and Trust Company, Hartford, Conn., as trustee Application September 2, 1953, Serial No. 378,000

Claims priority, application Netherlands September 5, 1952

2 Claims. (Cl. 313—109)

This invention relates to a low-pressure mercury-vapor discharge lamp containing a luminescent layer for converting the radiation produced by the discharge into visible light.

In order to obtain white light from a discharge lamp of the foregoing type, it is conventional to constitute the luminescent layer by a mixture of two phosphor materials, one of which produces red radiation of a wavelength of more than 6000 Å., and the other of which produces a radiation in the range between 4500 and 6000 Å. These phosphors are excited into luminescence by the radiation produced by the discharge within the lamp. Low pressure mercury vapor lamps have an emissive characteristic containing three maxima at 2537 Å., 3650 Å. and 4358 Å., the latter lying in a visible part of the spectrum at the blue-violet end.

The chief disadvantage of these known mixtures of phosphors is that they only absorb the 2537 Å. line; consequently, the energy present in the 3650 and 4358 Å. lines is not utilized to produce visible light so that the resultant efficiency is low. More importantly, failure of the luminescent layer to absorb the 4358 Å. line denotes that excessive blue-violet radiation will emanate from the discharge itself causing an undesirable color shift toward the violet end of the spectrum and thereby impairing the quality of the resultant white light. This excessive blue radiation may be compensated by employing larger quantities of a phosphor component emitting the complementary yellow-green radiation. However, this expedient is not practical since the blue radiation is still not suppressed; consequently the color reproduction of yellow and orange objects is extremely poor since they absorb quite strongly the blue-violet line so that the excess of green-yellow radiation becomes too prominent. All yellow and orange tinges thus exhibit an undesirable color shift towards green. One effective expedient is to employ a filter which will not transmit the blue radiation on the lamp wall. It is obvious, however, that the manufacture of the lamp thus becomes much more complicated and, hence, too costly.

A red luminescent phosphor is available which not only emits the desired deep red radiation but also efficiently absorbs the radiation of a wavelength of 4358 Å. and converts it into red light, namely, magnesium arsenate activated by manganese, in which the ratio between magnesia and arsenic pentoxide lies between 4:1 and 10:1. Consequently, by means of a mixture of this substance and an additional luminescent phosphor emitting a radiation between 4500 and 6000 Å., it is possible to obtain a discharge lamp which exhibits a very uniform spectral distribution of the radiated light and in which the troublesome blue-violet radiation is suppressed. However, it has been found that the use of a mixture of magnesium-arsenate and a further luminescent phosphor, for example, a halophosphate, results in the following difficulties. The manganese-activated magnesium-arsenate has a quantitative output which varies with the manganese content and exhibits a maximum between $5\times10^{-4}$ and $10^{-2}$ manganese atoms per magnesium atom, which fixes the ratio to be chosen so that maximum output may be obtained. Moreover, the absorption of radiation of a wavelength of 4358 Å. by this phosphor increases with an increase in manganese content. Consequently, to obtain the desired absorption of the 4358 A. line, since the ratio of manganese to magnesium is fixed by the previous condition, a greater quantity of this red phosphor is required so that a greater quantity of manganese is present in the layer. However, this denotes that a higher intensity of the emitted red radiation is obtained. To obtain a conventional white color of the light radiated by the lamp, a greater quantity of the luminescent phosphor producing the radiation between 4500 and 6000 Å. is required to complement the greater red radiation. Consequently, a lamp of this type must contain an extremely large quantity of phosphor material, which renders the completed lamp much too costly.

The chief object of the invention is to provide a low-pressure mercury-vapor discharge lamp containing a minimum quantity of luminescent material and which produces white light.

According to the invention, the pervious wall of a low-pressure mercury-vapor discharge lamp is provided with a first luminescent phosphor layer which, upon excitation by the radiation produced by the discharge, emits a radiation mainly between 4500 and 6000 Å. in wave length, and between this layer and the wall there is provided a second layer of luminescent phosphor material constituted by red luminescent magnesium arsenate, in which the ratio between magnesia and arsenic pentoxide lies between 4:1 and 101, and activated by a quantity of manganese between $1\times10^{-3}$ and $10\times10^{-3}$ atoms per magnesium atom.

Since the magnesium arsenate is not mixed with the first luminescent substance but is provided as a separate layer, the thickness thereof may be easily chosen so that the absorption of the blue-violet mercury line of a wavelength of 4358 Å. has the desired value. At this thickness, the magnesium arsenate emits a definite quantity of red radiation; and the quantity of the first luminescent substance may be chosen such that the desired total spectral distribution is obtained. The advantages of the invention will now be illustrated by the following example.

The red luminescent substance was constituted by manganese-activated magnesium arsenate, in which the ratio $MgO:As_2O_5=6:1$, and the manganese content is $8 \times 10^{-3}$ atoms per magnesium atom. The first luminescent substance, which emits between 4500 and 6000 Å. may, for example, be apatite having a formula

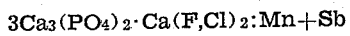

$$3Ca_3(PO_4)_2 \cdot Ca(F,Cl)_2:Mn+Sb$$

in which the ratio F:Cl is 4:1 and the quantities of manganese and antimony are equal to 0.09 and 1.0% by weight, respectively.

To design the discharge lamp to be manufactured, it is assumed that a 66% absorption of the line of a wavelength of 4358 Å. will be adequate. For this purpose, about 2 mgs. of magnesium arsenate per square centimetre is required. It may furthermore be determined that for a definite desired spectral distribution of the emitted light, the ratio between the quantities of the halophosphate and magnesium arsenate must equal about 4:1. If the halophosphate is mixed with the magnesium arsenate, about 8 mgs. of halophosphate and 2 mgs. of magnesium arsenate per square centimetre of surface are required in order to maintain the desired absorption of the blue mercury line of 4358 Å., a total, therefore, of 10 mgs. of phosphor.

If, according to the invention, the magnesium arsenate is applied as a homogeneous layer to the wall of the lamp and a layer of the halophosphate applied on top thereto, the quantity of magnesium arsenate required per square centimetre is 2 mgs., and the quantity of halophosphate required is 1 to 2 mgs., a total, therefore, of 3 or 4 mgs. Consequently, by employing the invention, a considerably smaller quantity of luminescent material is capable of providing the correct spectral distribution and the correct absorption of the deep blue mercury line of a wavelength of 4358 Å.

For the preparation of the manganese-activated arsenate, reference is had to a United States application, Serial No. 188,532, filed October 4, 1950. Other known luminescent substances which emit between 4500 and 6000 Å., and which are suitable for the invention are manganese activated zincberylliumsilicate and calciumsilicate activated with lead and manganese.

Alternatively the first luminescent layer which emits between 4500 and 6000 Å. may be constituted by more than one luminescent material, for example, a mixture of a halophosphate and manganese activated zincberyllium-silicate. As a further alternative, the materials, rather than mixed, may be applied in separate layers.

The accompanying drawing is a plan, partially-sectional view of the mercury-vapor discharge lamp of the invention. It comprises a pervious envelope 1, for example, of glass, coated with a layer of red-luminescing manganese-activated magnesium arsenate 2, on top of which is applied another layer 3 of a luminescent substance which emits between 4500 and 6000 Å., for example, apatite.

While I have described my invention in connection with specific embodiments and applications, other modifications thereof will be readily apparent to those skilled in this art without departing from the spirit and scope of the invention as defined in the appended claims.

What is claimed is:

1. A low-pressure mercury-vapor discharge lamp comprising an envelope including a wall pervious to light, a layer of red luminescent magnesium arsenate in which the ratio between magnesia and arsenic pentoxide lies in the range between 4:1 and 10:1 and which is activated with a quantity of manganese between $1 \times 10^{-3}$ and $10 \times 10^{-3}$ atoms per magnesium atom being disposed on the inside surface of said wall, and another luminescent layer which emits chiefly between 4500 and 6000 Å. disposed on the inner surface of said magnesium arsenate layer.

2. A low pressure mercury-vapor discharge lamp as claimed in claim 1 in which said other layer contains a halophosphate.

No references cited.